(12) United States Patent
Inoue (10) Patent No.: US 9,598,970 B2
(45) Date of Patent: Mar. 21, 2017

(54) BRUSH SEAL

(71) Applicant: EAGLE INDUSTRY CO., LTD., Minato-ku, Tokyo (JP)

(72) Inventor: Hideyuki Inoue, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 233 days.

(21) Appl. No.: 14/380,898

(22) PCT Filed: Feb. 28, 2013

(86) PCT No.: PCT/JP2013/055315
§ 371 (c)(1),
(2) Date: Aug. 25, 2014

(87) PCT Pub. No.: WO2013/153866
PCT Pub. Date: Oct. 17, 2013

(65) Prior Publication Data
US 2015/0014938 A1 Jan. 15, 2015

(30) Foreign Application Priority Data

Apr. 8, 2012 (JP) ................. 2012-087998

(51) Int. Cl.
*F16J 15/32* (2016.01)
*F01D 11/00* (2006.01)

(52) U.S. Cl.
CPC .......... *F01D 11/005* (2013.01); *F01D 11/001* (2013.01); *F16J 15/3288* (2013.01); *F16J 15/3292* (2013.01); *F05D 2240/56* (2013.01); *F05D 2250/121* (2013.01); *F05D 2250/22* (2013.01); *F05D 2250/75* (2013.01)

(58) Field of Classification Search
CPC .................................. F16J 15/3288
See application file for complete search history.

(56) References Cited

U.S. PATENT DOCUMENTS 3,678,529 A * 7/1972 Woods ............... A46B 9/10
15/169
4,415,309 A * 11/1983 Atterbury ......... F16J 15/3288
277/355

(Continued)

FOREIGN PATENT DOCUMENTS

EP 1052438 A2 11/2000
JP 2000-193095 A 7/2000
(Continued)

*Primary Examiner* — Vishal Patel
(74) *Attorney, Agent, or Firm* — Law Office of Katsuhiro Arai (57) ABSTRACT

A brush seal includes a bristle part formed by multiple bristles attached to a stationary part between the stationary part and a rotational part that undergo relative motion by maintaining a space in between; and a back plate attached adjacent to the bristle part on its low-pressure side to restrict the movement of the bristle part. The brush seal for sealing a fluid between the stationary part and rotational part is characterized in that the bristle part is formed by the multiple bristles such that the multiple bristles arranged in a direction of fluid are mutually fixed between a base end and a free end to form planar bristles arranged continuously in layers in a circumferential direction to form the bristle part.

6 Claims, 5 Drawing Sheets

(56) References Cited

U.S. PATENT DOCUMENTS

| | | | |
|---|---|---|---|
| 4,678,113 A * | 7/1987 | Bridges | A46D 1/08 228/160 |
| 5,076,590 A * | 12/1991 | Steinetz | F02K 1/805 239/127.1 |
| 5,474,306 A | 12/1995 | Bagepalli et al. | |
| 5,975,535 A * | 11/1999 | Gail | F16J 15/3288 277/355 |
| 6,170,831 B1 | 1/2001 | Bouchard | |
| 2003/0001339 A1 | 1/2003 | Inoue | |
| 2003/0094848 A1 | 5/2003 | Shia et al. | |
| 2004/0232621 A1 * | 11/2004 | Kono | F16J 15/3292 277/355 |
| 2007/0085277 A1 * | 4/2007 | Rhodes | F01D 11/001 277/355 |
| 2013/0001883 A1 * | 1/2013 | Addis | F16J 15/3288 277/355 |
| 2013/0168926 A1 * | 7/2013 | Cui | F01D 11/001 277/355 |

FOREIGN PATENT DOCUMENTS

| | | |
|---|---|---|
| JP | 2001-073708 A | 3/2001 |
| JP | 2003-014128 A | 1/2003 |
| JP | 2003343730 A | 12/2003 |
| JP | 2008-121512 A | 5/2008 |

\* cited by examiner

BRUSH SEAL

This application is the U.S. National Phase under 35 U.S.C. §371 of International Application PCT/JP2013/055315, filed Feb. 28, 2013, which claims priority to Japanese Patent Application No. 2012-087998, filed Apr. 8, 2012. The International Application was published under PCT Article 21(2) in a language other than English.

TECHNICAL FIELD

The present invention relates to a brush seal for providing a seal between a rotational axis and its mating part that undergo relative motion in an airplane, gas turbine, steam turbine, etc., for example.

BACKGROUND ART

Sealing mechanisms are provided around a rotational axis in a gas turbine to prevent gas from leaking to the low-pressure side from the high-pressure side, for example.

Labyrinth seals, which are non-contact seals, have traditionally been used for these sealing mechanisms, but as labyrinth seals make no contact, there are limits to how much their sealing performance can be improved. Accordingly, brush seals are now being used to achieve greater sealing performance.

A brush seal comprises multiple bristles formed into a ring shape (brush seal bristles), and the tips of these brush seal bristles contact the rotating side to provide a seal.

The rotating side, such as a rotor in a gas turbine, deforms due to centrifugal force and heat as the turbine operates, while the housing, which is the stationary side, also expands due to heat, and consequently the distance between the brush seal and rotor changes.

This distance change is absorbed by the deflection of bristles, but since deflection of bristles toward the low-pressure side can cause the sealing performance to drop, a back plate is provided on the low-pressure side of brush seal bristles to prevent them from deflecting toward the low-pressure side. Additionally, a space is provided on the high-pressure side of bristles to allow for deflection of bristles. (Refer to FIGS. 8 to 10 on Page 10 of Patent Literature 1, for example.)

If a brush seal is used in a high-pressure area in a steam turbine, etc., however, its bristles will flap, especially on the high-pressure side, and eventually break.

If bristles break, the broken bristles will no longer contact the rotor, thereby causing the sealing performance of the brush seal to drop.

A drop in the sealing performance of the brush seal can lead to a problem of lower output from the turbine, for example.

To eliminate the flapping of bristles on the high-pressure side, solutions are proposed that involve providing a braking plate also on the high-pressure side of brush seal bristles to restrict the deflection of brush seal bristles, while providing through holes in the braking plate to suppress generation of turbulent flows and particularly prevent the bristles from flapping on the high-pressure side. (Refer to Patent Literature 2, for example.)

However, the solution described in Patent Literature 2 is such that the movement of brush seal bristles is strongly restricted down their length until near the rotor by the back plate on the low-pressure side and braking plate on the high-pressure side, resulting in a shorter free-deflection length of brush seal bristles.

This increases the rigidity of brush seal bristles and raises their contact pressure with the rotor, which in turn presents a problem of increased wear of the bristles and rotor in a steady state.

To solve the problems of the solution described in Patent Literature 2, solutions are proposed that involve providing restraining bristles having just enough elasticity to not prevent the deformation of the bristle part upon contact, instead of the braking plate on the high-pressure side of bristles. (Refer to Patent Literature 3, for example.)

This brush seal described in Patent Literature 3 absorbs any change in the interval between the stationary part and rotational part by the deflection of the bristle part, and because the movement of the bristle part is suppressed by the back plate on the low-pressure side, these bristles deflect in the direction of the restraining bristles; since the restraining bristles have just enough elasticity to prevent the deformation of the bristle part upon contact, however, the restraining bristles undergo elastic deformation and thereby absorb the deformation of the bristle part, and consequently any increase in wear can be prevented in a steady state without increasing the contact friction force as the interval between the stationary part and rotational part changes.

However, the brush seal described in Patent Literature 3 presents a problem of high manufacturing cost because restraining bristles formed by bundled wires (bristles) must be provided on the high-pressure side of the bristle part.

PRIOR ART LITERATURES

Patent Literatures

Patent Literature 1: Japanese Patent Laid-open No. 2003-14128 (FIG. 8 on Page 10)
Patent Literature 2: Japanese Patent Laid-open No. 2001-73708
Patent Literature 3: Japanese Patent Laid-open No. 2008-121512

SUMMARY OF INVENTION

Problems to be Solved by Invention

The present invention was developed to solve the aforementioned problems of prior arts and the object of the present invention is to provide a brush seal of simple configuration that ensures degrees of freedom of bristles toward upstream and prevents their flapping at the same time, while also increasing the rigidity of bristles in the direction of pressure difference between the high-pressure side and low-pressure side to reduce the wear of bristles.

Means to Solve Problems

To achieve the aforementioned object, firstly, the brush seal proposed by the present invention is a brush seal having: a bristle part formed by multiple bristles attached to a stationary part between the stationary part and a rotational part that undergo relative motion by maintaining a space in between; and a back plate attached adjacent to the bristle part on its low-pressure side to restrict the movement of the bristle part, for the purpose of sealing the fluid flowing between the stationary part and rotational part; wherein such brush seal is characterized in that the bristle part formed by multiple bristles is such that the multiple bristles arranged in the direction of pressure difference between the high-pressure side and low-pressure side are mutually fixed between the base end and free end to form planar bristles and these planar bristles are arranged continuously in layers in the circumferential direction to form the bristle part.

According to these characteristics, this brush seal provides higher rigidity in the direction of pressure difference between the high-pressure side and low-pressure side (=axial direction of the rotor) compared to when conventionally known brush seal bristles are used, and thus can be applied to steam turbines and other high-pressure equipment.

Additionally, since degrees of freedom of the tips of bristles are ensured in the direction orthogonal to the direction of pressure difference (=circumferential direction), their rigidity is low in the direction orthogonal to the direction of pressure difference and therefore the free end can separate from the outer periphery surface of the rotational part due to the dynamic pressure of the rotational part even when it is rotating at low speed, resulting in reduced wear and improved wear resistance.

Furthermore, the ability of the tips of bristles to move independently of the conical vibration of the rotational part (=vibration generated by the tilting of the axis) also helps to reduce wear and improve wear resistance.

Secondly, the brush seal proposed by the present invention is characterized in that, in the first characteristics, the fixing is done by means of welding.

According to these characteristics, multiple bristles can be fixed reliably and proper rigidity of the bristle part can be achieved.

Thirdly, the brush seal proposed by the present invention is characterized in that, in the first or second characteristics, the fixing is done at least in one location between the base end and free end of bristles.

According to these characteristics, any location(s) and number of fixed part (s) can be set according to the required rigidity of the bristle part, which leads to optimal rigidity of the bristle part.

Fourthly, the brush seal proposed by the present invention is characterized in that, in any of the first through third characteristics, the bristles have a circular cross-section shape.

Fifthly, the brush seal proposed by the present invention is characterized in that, in any of the first through third characteristics, the bristles have a square cross-section shape. According to these characteristics, the brush seal can be manufactured relatively inexpensively.

Sixthly, the brush seal proposed by the present invention is characterized in that, in any of the first through fifth characteristics, the planar bristles are formed in such a way that they are folded at the longitudinal center, with the folded part becoming the base end and the tip, the free end.

According to these characteristics, the planar bristles can be manufactured efficiently and fixing of the planar bristles at their base end also becomes easy.

Effects of Invention

The invention described in the present application for patent provides higher rigidity in the direction of pressure difference between the high-pressure side and low-pressure side (=axial direction of the rotor) compared to when conventionally known brush seal bristles are used, and thus can be applied to steam turbines and other high-pressure equipment.

Additionally, since degrees of freedom of the tips of bristles are ensured in the direction orthogonal to the direction of pressure difference (=circumferential direction), their rigidity is low in the direction orthogonal to the direction of pressure difference and therefore the free end can separate from the outer periphery surface of the rotational part due to the dynamic pressure of the rotational part even when it is rotating at low speed, resulting in reduced wear and improved wear resistance.

Furthermore, the ability of the tips of bristles to move independently of the conical vibration of the rotational part also helps to reduce wear and improve wear resistance.

MODES FOR CARRYING OUT THE INVENTION

Modes for carrying out a brush seal pertaining to the present invention are explained in detail by referring to the drawings, but it should be noted that the present invention is not at all restricted to these interpretations, and various changes, modifications and improvements can be added according to the knowledge of those skilled in the art so long as they do not deviate from the scope of the present invention.

Embodiment 1

Figure 1:
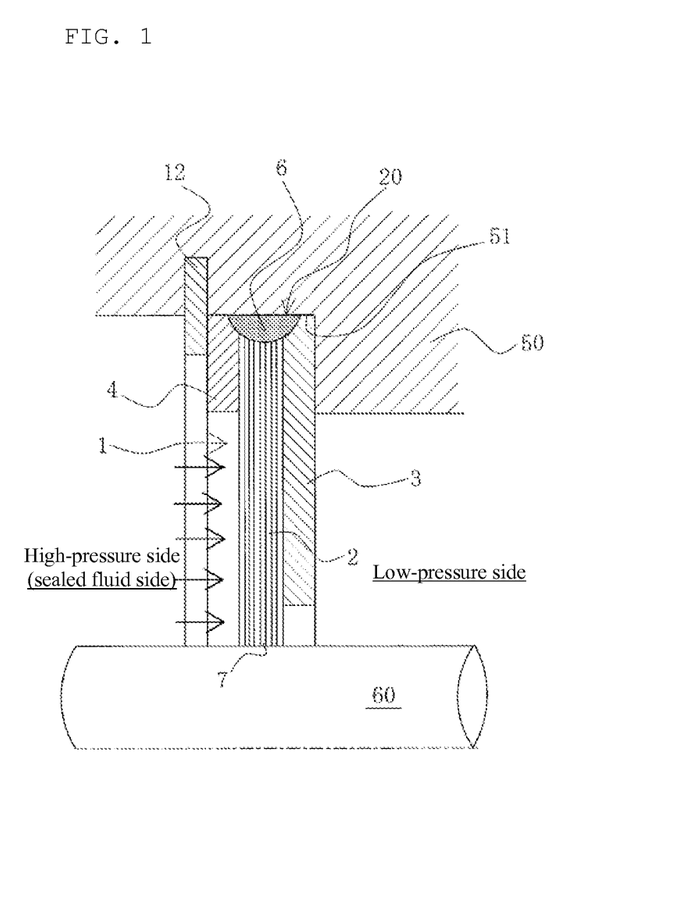
FIG. 1 is a longitudinal section view showing the top half of a brush seal pertaining to Embodiment 1 of the present invention

FIG. 1 is a longitudinal section view showing the top half of a brush seal pertaining to Embodiment 1 of the present invention In FIG. 1, a brush seal device 1 is formed in a ring shape and its fixed part 20 on the outer periphery side is attached, via a snap ring 12, to a step 51 provided on the inner periphery surface of a casing 50 which is a component of one section of the constituent components.

Also, the inner periphery side of the brush seal device 1 is provided in a manner opposingly contacting or positioned close to the outer periphery surface of a rotor 60 which is a component of the other section. And, the brush seal device 1 seals the fluid and prevents the sealed fluid from leaking to the low-pressure side from the high-pressure side.

Note that the casing 50 constitutes the stationary part of the present invention, while the rotor 60 constitutes the rotational part of the present invention.

On the low-pressure side of a bristle part 2 which is a key component member of this brush seal device 1, a circular back plate 3 is provided in contact with the bristle part 2 and which supports the bristle part 2 against the pressure of the sealed fluid acting upon it.

On the surface of the bristle part 2 on the high-pressure side, a retention part 4 is formed as a ring plate and positioned integrally with the back plate 3 so as to sandwich a base end 6 of the bristle part 2 on the outer periphery side between the retention part and the back plate 3. This retention part 4 is tapered widthwise in the diameter direction to expose the bristle part 2 so that the sealed fluid can act upon the side faces of the bristle part 2.

Also, the back plate 3 and the base end 6 and retention part 4 of the bristle part 2 are welded to the outer periphery to constitute the fixed part 20, which is fixed to the step 51 provided on the inner periphery surface of the casing 50.

The bristle part 2 is formed by tens to hundreds of thousands of bristles (coarse hairs) 5 arranged from the outer periphery side toward the inner periphery side, where multiple bristles are arranged in the direction of pressure difference between the high-pressure side and low-pressure side to form a specified width, while multiple bristles 5 forming a specified width are also arranged continuously in the circumferential direction in a circular shape.

In addition, a free end 7 of the bristles 5 on the inner periphery side is provided in a manner opposingly contacting or positioned close to the outer periphery surface of the rotor 60 which is the other component.

The wire diameter of bristles 5 is generally 0.02 mm to 0.5 mm. For the material of bristles 5, steel, stainless steel or nickel alloy, heat-resistant cobalt alloy, or the like, is used.

Figure 2:
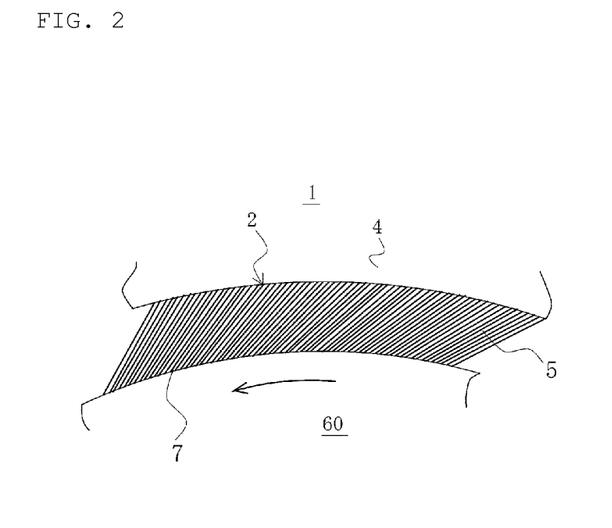
FIG. 2 is a front view of the brush seal in FIG. 1 as viewed from the high-pressure side

FIG. 2 is a front view of the brush seal in FIG. 1 as viewed from the high-pressure side.

The brush seal 1 in FIG. 2 is in a normal state where the brush seal 1 and rotor 60 are not shaking, and its bristles 5 are arranged straight in a manner tilting in the rotating direction of the rotor 60. In this normal state of the brush seal 1, the free end 7 of the bristles 5 is contacting or positioned close to the outer periphery surface of the rotor 60.

Figure 3:
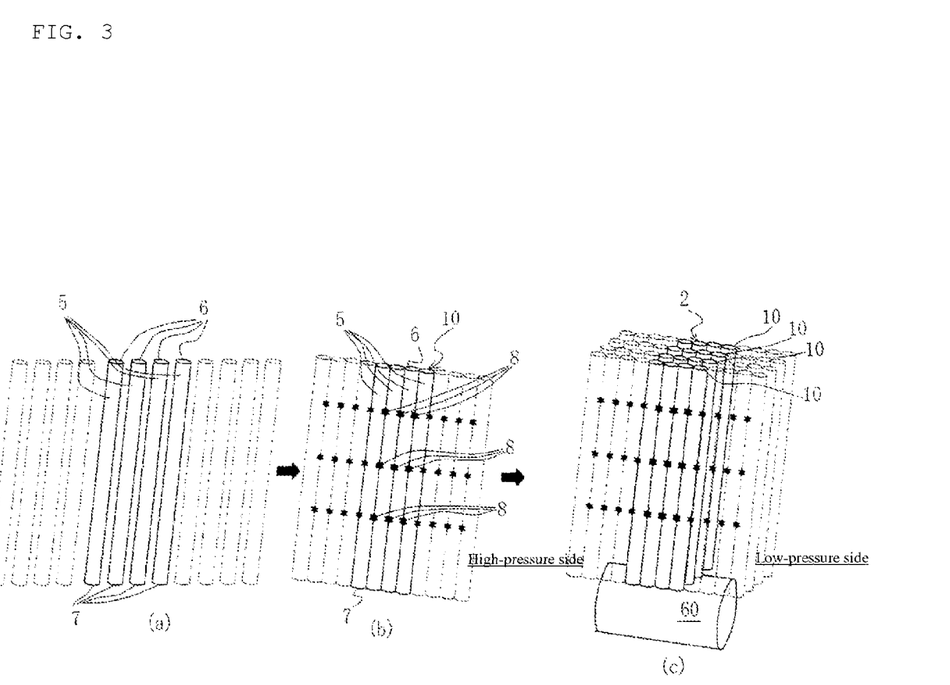
FIG. 3 is a perspective view explaining the process of forming a bristle part pertaining to Embodiment 1 of the present invention

FIG. 3 is a perspective view explaining the process of forming a bristle part pertaining to Embodiment 1 of the present invention. In FIG. 3, only four bristles arranged in the direction of pressure difference between the high-pressure side and low-pressure side are shown for the purpose of illustration, but in reality hundreds of bristles are arranged to form a specified width.

In FIG. 3, multiple bristles 5 having a circular cross-section shape and specified length are prepared and arranged in a single row so that the multiple bristles 5 form a specified width in the direction of pressure difference between the high-pressure side and low-pressure side, with adjacent bristles 5 contacting each other, as shown in FIGS. 3(*a*) and 3(*b*).

As shown in FIG. 3 (*b*), the multiple bristles 5 arranged in a single row are fixed to the adjacent bristles 5 by means of welding, fusion, etc., between the base end 6 and free end 7. In FIG. 3 (*b*), three fixed parts 8 are provided in the diameter direction between the base end 6 and free end 7, but this is not a requirement and any location(s) and number of fixed part(s) can be set according to the required rigidity of the bristle part 2, as long as there is at least one fixed part. Of the fixed parts 8, the position of the fixed part 8 close to the free end 7 is important in determining the rigidity at the free end of bristles 5.

As mentioned above, the multiple bristles 5 mutually fixed at the center in the diameter direction are formed in a planar shape to form planar bristles 10, as shown in FIG. 3 (*b*).

The planar bristles 10 are arranged continuously in layers in the circumferential direction to form the circular bristle part 2, as shown in FIG. 3 (*c*).

The planar bristles 10 positioned side by side in the circumferential direction may be alternately shifted by one half the diameter of the bristle 5 in the direction of pressure difference and arranged continuously in layers in the circumferential direction, in which case the gaps between planar bristles 10 are reduced and thus the fluid resistance to prevent leakage of the sealed fluid increases.

The planar bristles 10 thus formed provide higher rigidity in the direction of pressure difference between the high-pressure side and low-pressure side (=axial direction of the rotor) compared to when conventionally known brush seal bristles are used, and thus can be applied to steam turbines and other high-pressure equipment.

Additionally, the planar bristles 10 are such that, since degrees of freedom of the tips of individual bristles 5, or specifically degrees of freedom of the tips of individual bristles 5 in the direction orthogonal to the direction of pressure difference (=circumferential direction) between the fixed part 8 close to the free end 7 and the free end 7, are ensured, their rigidity is low in the direction orthogonal to the direction of pressure difference and therefore the free end 7 can separate from the outer periphery surface of the rotor 60 due to the dynamic pressure of the rotor 60 even when it is rotating at low speed, resulting in such advantages as reduced wear and improved wear resistance.

Furthermore, the ability of the tips of individual bristles 5 to move independently of the conical vibration of the rotor 60 also helps to reduce wear and improve wear resistance.

Embodiment 2

Figure 4:
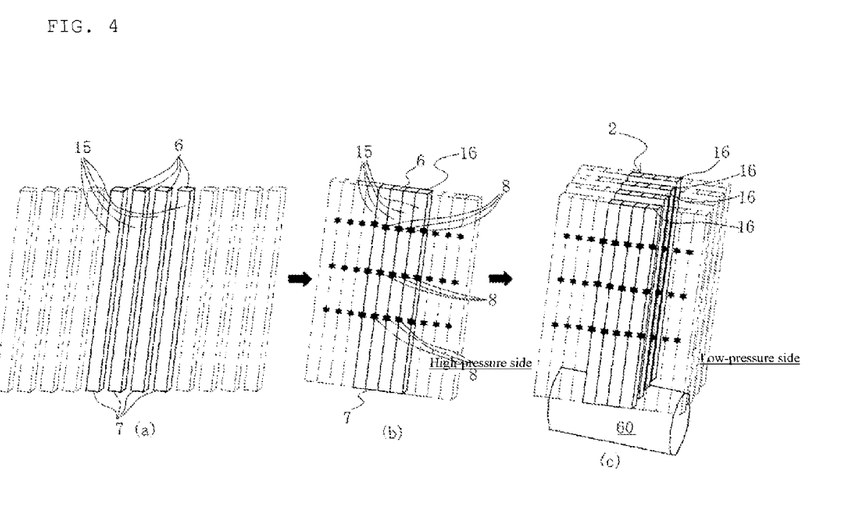
FIG. 4 is a perspective view explaining the process of forming a bristle part pertaining to Embodiment 2 of the present invention

FIG. 4 is a perspective view explaining the process of forming a bristle part pertaining to Embodiment 2 of the present invention.

Embodiment 2 shown in FIG. 4 is different from Embodiment 1 shown in FIG. 3 in that individual bristles have a square cross-section shape, but since the remainder of the configuration is the same as Embodiment 1, redundant explanations are omitted.

In FIG. 4, individual bristles 15 have a square cross-section shape and thus planar bristles 16 constituted by the square bristles 15 have a constant thickness and consequently provide higher rigidity in the direction of pressure difference between the high-pressure side and low-pressure side (=axial direction of the rotor) compared to when conventionally known brush seal bristles are used, and needless to say they can be applied to steam turbines and other high-pressure equipment.

Additionally, the planar bristles 16 are such that, since degrees of freedom of the tips of individual bristles 15, or specifically degrees of freedom of the tips of individual bristles 15 in the direction orthogonal to the direction of pressure difference (=circumferential direction) between the fixed part 8 close to the free end 7 and the free end 7, are ensured, their rigidity is low in the direction orthogonal to the direction of pressure difference and therefore the free end 7 can separate from the outer periphery surface of the rotor 60 due to the dynamic pressure of the rotor 60 even when it is rotating at low speed, resulting in such advantages as reduced wear and improved wear resistance.

Furthermore, the ability of the tips of individual bristles 15 to move independently of the conical vibration of the rotor 60 also helps to reduce wear and improve wear resistance.

Figure 5:
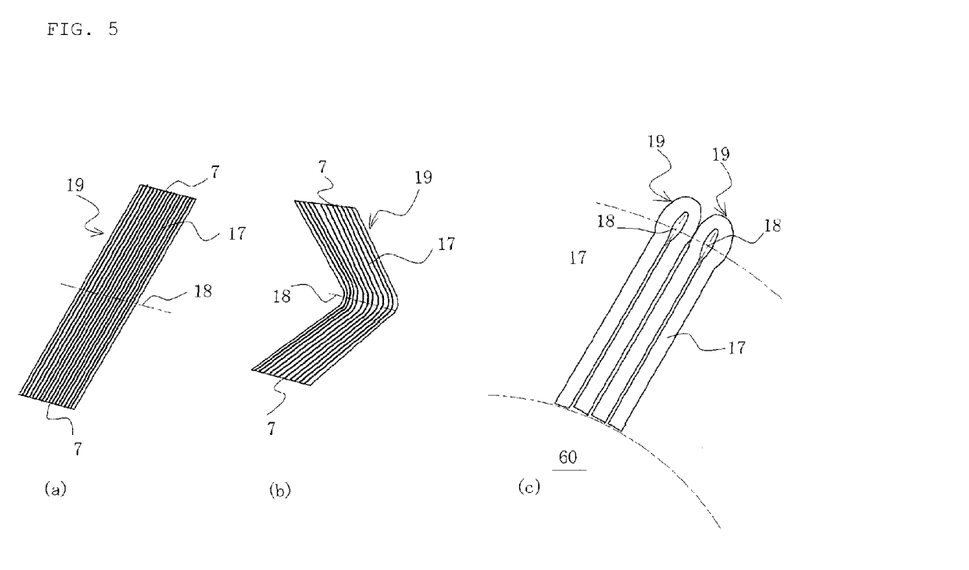
FIG. 5 is a drawing explaining another example of how a bristle part pertaining to Embodiment 1 or 2 of the present invention is manufactured

FIG. 5 is a drawing explaining another example of how a bristle part pertaining to Embodiment 1 or 2 of the present invention is manufactured.

In addition to forming the planar bristles 10, 16 shown in FIGS. 3 and 4 one by one and then arranging them in layers in the circumferential direction to form the bristle part 2, the method shown in FIG. 5 is available.

In FIG. 5 (a), bristles 17 that are roughly twice as long as the bristles shown in FIGS. 3 and 4 are arranged in a single row to form a specified width. When arranging the bristles 17, individual bristles 17 may be tentatively fixed to adjacent bristles using adhesive, etc. Then, the bristles 17 positioned side by side are fixed by means of welding, fusion, etc., between the longitudinal center 18 and free ends 7, 7 on both sides to form planar bristles 19.

Next, the planar bristles 19 are folded into two at the center 18 being the fulcrum, as shown in FIG. 5 (b). When each planar bristle 19 is folded this way, two planar bristles can be formed.

The folded planar bristles 19 are arranged continuously in layers in the circumferential direction to form the circular bristle part 2, as shown in FIG. 5 (c).

According to this manufacturing method, the bristle parts 2 can be formed relatively efficiently.

Figure 6:
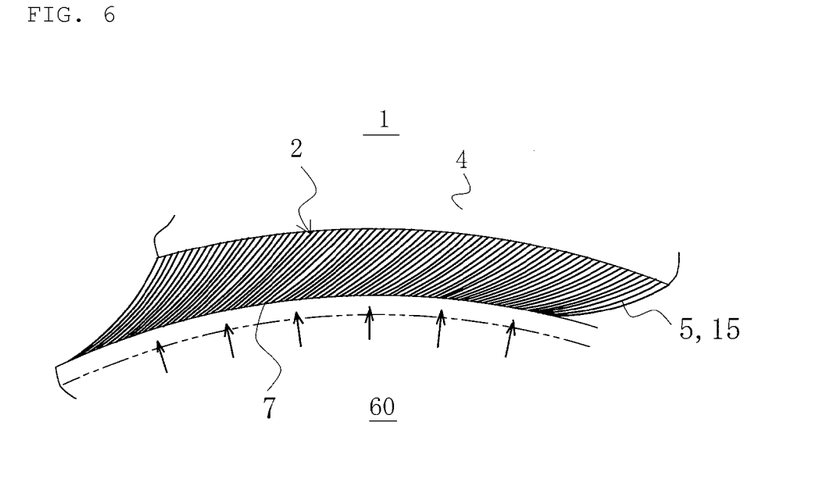
FIG. 6 is a front view of the brush seal in FIG. 1 with its rotational part eccentrically shifted, as viewed from the high-pressure side

FIG. 6 is a front view of the brush seal in FIG. 1 with its rotational part eccentrically shifted, as viewed from the high-pressure side.

The brush seal 1 is such that, as the rotor 60 rotates and contacts the free end 7 of bristles 5, 15 as a result of vibration, shaking, etc., the bristles 5, 15 tilt more while being pressed against the rotor 60. Here, since degrees of freedom of the tips of bristles 5, 15, or specifically degrees of freedom of the tips of individual bristles 5, 15 in the direction orthogonal to the direction of pressure difference, are ensured, their rigidity is low in the direction orthogonal to the direction of pressure difference and therefore the free end 7 can separate from the outer periphery surface of the rotor 60 due to the dynamic pressure of the rotor 60 even when it is rotating at low speed, resulting in such advantages as reduced wear and improved wear resistance. Furthermore, the ability of the individual bristles 5, 15 to move independently of the conical vibration of the rotor 60 also helps to reduce wear and improve wear resistance.

The foregoing explained the embodiments of the present invention using drawings, but it should be noted that the specific constitutions are not at all restricted to these embodiments and changes and additions are also included in the present invention so long as they do not deviate from the purpose of the present invention.

For instance, the embodiments explained bristles having a circular or square cross-section shape, but the bristles are not at all restricted to the foregoing and bristles having a polygonal, oval or other cross-section shape can also be used.

In addition, the embodiments explained an example of manufacturing planar bristles where one planar bristle which is twice as long is folded into two at the center representing the fulcrum, to manufacture two planar bristles, for instance, but the manufacturing method is not at all restricted to the foregoing and needless to say planar bristles can also be manufactured by cutting to specified lengths one planar bristle which is twice as long or longer.

In addition, the embodiments explained a case where the bristles positioned side by side are fixed at three locations in the diameter direction between the base end and free end of multiple bristles arranged in a single row, for instance, but the fixed parts are not at all restricted to the foregoing and other variations are also permitted as long as there is at least one fixed location. It is also possible to change the fixed position for each of the planar bristles arranged in the circumferential direction, to prevent fixed positions from concentrating at one location in the diameter direction.

REFERENCE SIGNS

1 Brush seal device
2 Bristle part
3 Back plate
4 Retention part
5 Bristle
6 Base end
7 Free end
8 Fixed part
10 Planar bristle
12 Snap ring
15 Bristle
16 Planar bristle
17 Bristle
18 Center
19 Planar bristle
20 Fixed part
50 Casing (stationary part)
51 Step
60 Rotor (rotational part)

The invention claimed is:

1. A brush seal having: a bristle part formed by multiple bristles attached to a stationary part between the stationary part and a rotational part that undergo relative motion by maintaining a space in between;
   a back plate attached adjacent to the bristle part on a low-pressure side of the bristle part to limit movement of the bristle part,
   said brush seal for sealing fluid between the stationary part and rotational part; said brush seal characterized in that the bristle part formed by multiple bristles is such that the multiple bristles constitute planar bristles, each planar bristle extending and formed by multiple bristles aligned in a direction of pressure difference between the high-pressure side and low-pressure side and mutually fixed by a weld at multiple locations of each bristle between a base end and free end of the bristles, and these planar bristles are arranged continuously in discrete layers in a circumferential direction to form the bristle part; and
   all the welds are spaced apart from each other in a radial direction of the bristles.

2. A brush seal according to claim 1, characterized in that the bristles have a circular cross-section shape.

3. A brush seal according to claim 1, characterized in that the bristles have a square cross-section shape.

4. A brush seal according to claim 1, characterized in that the planar bristles are formed in such a way that they are folded at a longitudinal center, with a folded part becoming the base end and a tip, the free end.

5. A brush seal according to claim 2, characterized in that the planar bristles are formed in such a way that they are folded at a longitudinal center, with a folded part becoming the base end and a tip, the free end.

6. A brush seal according to claim 3, characterized in that the planar bristles are formed in such a way that they are folded at a longitudinal center, with a folded part becoming the base end and a tip, the free end.

* * * * *